US005985459A

United States Patent [19]

Kwiecien et al.

[11] Patent Number: 5,985,459

[45] Date of Patent: Nov. 16, 1999

[54] METHOD OF TREATING RAZOR BLADE CUTTING EDGES

[75] Inventors: Michael J. Kwiecien, Quincy; Hoang Mai Trankiem, Watertown; Charles Robert Parent, Westwood; John L Howard, West Roxbury, all of Mass.

[73] Assignee: The Gillette Company, Boston, Mass.

[21] Appl. No.: 08/741,794

[22] Filed: Oct. 31, 1996

[51] Int. Cl.$^6$ .................... B32B 27/00

[52] U.S. Cl. .................... 428/421; 30/346.5; 30/346.54; 76/104.1; 76/DIG. 8; 427/388.4; 428/422

[58] Field of Search .................... 30/346.5, 346.56; 76/104.1, 11.38; 427/388.4; 428/421, 422

[56] References Cited

U.S. PATENT DOCUMENTS

| | | | |
|---|---|---|---|
| 2,937,976 | 5/1960 | Granahan et al. | 167/85 |
| 3,071,856 | 1/1963 | Fishbein | 30/346 |
| 3,461,129 | 8/1969 | Middleton | 260/307 |
| 3,518,110 | 6/1970 | Fishbein | 117/93.4 |
| 3,638,308 | 2/1972 | Fischbein et al. | 30/346.53 |
| 3,658,742 | 4/1972 | Fish et al. | 260/29.6 F |
| 4,360,388 | 11/1982 | Nauroth et al. | 106/288 |
| 5,237,049 | 8/1993 | Cavanaugh et al. | 528/491 |
| 5,263,256 | 11/1993 | Trankiem | 30/346.54 |
| 5,328,946 | 7/1994 | Tuminello et al. | 524/462 |
| 5,356,986 | 10/1994 | Stewart et al. | 524/462 |
| 5,364,929 | 11/1994 | Dee et al. | 528/491 |
| 5,459,191 | 10/1995 | Tuminello et al. | 524/462 |
| 5,477,756 | 12/1995 | Trankiem et al. | 30/346.54 X |

OTHER PUBLICATIONS

Dissolving Poly(tetrafluoroehtylene) in Low Boiling Halocarbons, Journal of Applied Polymer Science (1995) vol. 56, pp. 495–499.

Dissolving Perfluoropolymers in Supercritical Carbon Dioxide, Marcromolecules (1995) vol. 28, pp. 1506–1510.

Dissolution of Poly(tetrafluoroethylene), Macromolecules (1985) vol. 18, pp. 1222–1228.

Thermodynamics of Poly(tetrafluoroethylene) Solubility, Macromolecules (1994) vol. 27, pp. 669–676.

Characterization of a Perfluorotetradecahydrophenanthrene Oligomer, Analytical Chemistry, vol. 67 No. 13, Jul. 1, 1995.

Material Safety Data, Flutec PP11, Predominantly Perfluoroperhydrophenanthrene, no date.

DuPont Specialty Chemicals, Krytox performance Lubricants, pp. 1–10, no date.

*Primary Examiner*—Michael Lusignan
*Attorney, Agent, or Firm*—Chester Cekala

[57] ABSTRACT

The present invention relates to razor blade cutting edges which exhibit an improvement in the first shave. Conventional razor blade cutting edges exhibit surprisingly high initial cutting forces. Razor blades produced according to the present process exhibit significantly lower initial cutting forces which correlates with a more comfortable first shave. Improved blades according to the present invention involve treating conventional razor blade cutting edges having an adherent polyfluorocarbon coating with a solvent to partially remove some of the coating. Preferred solvents include perfluoroalkanes, perfluorocycloalkanes, perfluoropolyethers having a critical temperature or boiling point above the dissolution temperature for the polyfluorocarbon in the solvent. The present invention also relates to the method of producing these razor blade cutting edges.

20 Claims, 5 Drawing Sheets

METHOD OF TREATING RAZOR BLADE CUTTING EDGES

FIELD OF THE INVENTION

This invention relates to an improved polyfluorocarbon-coated razor blade cutting edge and its novel method of manufacture. Specifically, this invention relates to razor blade cutting edges which have a thin polyfluorocarbon coating. The coatings of the present invention exhibit good blade adhesion and a significantly improved first shave.

BACKGROUND OF INVENTION

This invention concerns a novel process for treating polyfluorocarbon-coated razor blade cutting edges, particularly polytetrafluoroethylene-coated razor blade cutting edges.

Uncoated razor blades, despite their sharpness, cannot be employed for shaving a dry beard without excessive discomfort and pain, and it is as a practical matter necessary to employ with them a beard-softening agent such as water and/or a shaving cream or soap. The pain and irritation produced by shaving with uncoated blades are due to the excessive force required to draw the cutting edge of the blade through the unsoftened beard hairs, which force is transmitted to the nerves in the skin adjacent the hair follicles from which the beard hairs extend, and, as is well known, the irritation produced by excessive pulling of these hairs may continue for a considerable period of time after the pulling has ceased. Blade coatings were developed to solve these shortcomings.

Granahan et al., U.S. Pat. No. 2,937,976, issued May 24, 1960, describes a "coated" blade which provides a reduction in the force required to cut beard hair. The coating material consists of an organosilicon-containing polymer which is partially cured to a gel which remains adherent to the blade. Although these coated blades met with considerable commercial success, the coatings were not permanent and would wear off relatively quickly.

Fischbein, U.S. Pat. No. 3,071,856, issued Jan. 8, 1963, describes fluorocarbon-coated blades, particularly polytetrafluoroethylene-coated blades. The blades may be coated by (1) placing the blade edge in close proximity to a supply of the fluorocarbon and subsequently heating the blade, (2) spraying blade with a fluorocarbon dispersion, (3) dipping the blade into a fluorocarbon dispersion or (4) by use of electrophoresis. The resulting blade was later heated to sinter the polytetrafluoroethylene onto the blade edge. Fischbein is silent on the use of fluorocarbon solutions.

Fischbein, U.S. Pat. No. 3,518,110, issued Jun. 30, 1970, discloses an improved solid fluorocarbon telomer for use in coating safety razor blades. The solid fluorocarbon polymer has a melting point between 310° C. and 332° C. and has a melt flow rate of from 0.005 to 600 grams per ten minutes at 350° C. The molecular weight is estimated to be between 25,000 and 500,000. For best results, the solid fluorocarbon polymer is broken down to 0.1 to 1 micron particles. The dispersion is electrostatically sprayed onto stainless steel blades.

Fish et al, U.S. Pat. No. 3,658,742, issued Apr. 25, 1972, discloses an aqueous polytetrafluoroethylene (PTFE) dispersion containing Triton X-100 brand wetting agent which is electrostatically sprayed on blade edges. The aqueous dispersion is prepared by exchanging the Freon solvent in Vydax brand PTFE dispersion (PTFE+Freon solvent), distributed by E.I. DuPont, Wilmington, Del., with isopropyl alcohol and then exchanging the isopropyl alcohol with water.

Trankiem, U.S. Pat. No. 5,263,256, issued Nov. 23, 1993 (Docket No. 7951) discloses on an improved method of forming a polyfluorocarbon coating on a razor blade cutting edge comprising the steps of subjecting a fluorocarbon polymer having a molecular weight of at least about 1,000,000 to ionizing radiation to reduce the average molecular weight to from about 700 to about 700,000; dispersing the irradiated fluorocarbon polymer in an aqueous solution; coating said razor blade cutting edge with the dispersion; and heating the coating obtained to melt, partially melt or sinter the fluorocarbon polymer.

Trankiem, U.S. patent appn. Ser. No. 08/232,197, filed Apr. 28, 1994 (Docket No. 4210) discloses a method of forming a polyfluorocarbon coating on a razor blade cutting edge which comprises subjecting a fluorocarbon polymer having a molecular weight of at least 1,000,000 in dry powder form to ionizing irradiation to reduce the molecular weight of the polymer, forming a dispersion of the irradiated polymer in a volatile organic liquid, spraying the dispersion on to a razor blade cutting edge and heating the coating obtained to sinter the polyfluorocarbon. The polyfluorocarbon preferably is polytetrafluoroethylene and irradiation preferably is effected to obtain a telomer having a molecular weight of about 25,000.

U.S. Pat. No. 5,328,946 to Tuminello et al. discloses perfluorinated cycloalkane solvents for dissolving high melting polymers containing tetrafluoroethylene. These solvents are said to dissolve such polymers more rapidly, and/or are more stable, than previously known solvents. Also disclosed is a process for dissolution of the polymers and their resulting solutions. The solutions are useful for making polymer films, coatings and for encapsulating objects.

U.S. Pat. No. 5,364,929 to Dee et al. discloses a process for dissolving high melting polymers containing tetrafluoroethylene units at pressures greater than autogenous pressure, using selected halogenated solvents that are often not solvents resulting from this process. The resulting solutions are said to be useful for preparing fibers and paper-like webs from these polymers.

U.S. Pat. No. 4,360,388 discloses certain solvents for tetrafluoroethylene (TFE) polymers, including perfluorodecalin, perfluoromethyldecalin, perfluoromethyldecalin, perfluoromethylcyclohexane and perfluoro(1,3-dimethylcyclohexane). All of these solvents are believed to have critical temperatures below 340° C., and hence are not solvents for PTFE.

B. Chu, et al., in a series of papers [Macromol., vol. 20, p. 702–703 (1987); Macromol., vol. 21, p. 397–402 (1988); Macromol., vol. 22, p.831–837 (1989); J. Appl. Polym Sci., Appl. Polym. Sym., vol. 45, p. 243–260 (1990)] describe the measurement of the molecular weight of polytetrafluoroethylene (hereinafter sometimes PTFE) in solution. The solvents used in these studies were perfluorotetracosane and oligomers of poly(chlorotrifluoroethylene).

P. Smith and K. Gardner, Macromol., vol. 18, p. 1222–1228 (1985) review and discuss both the practical and theoretical aspects of dissolving PTFE. As reported by them, PTFE has been dissolved only in perfluorokerosenes and perfluorinated oils, in other words, perfluorinated higher molecular weight alkanes. They report that PTFE will not dissolve in perfluorodecalin, octafluoronaphthalene or decafluorobenzophenone.

U.S. Pat. No. 3,461,129 reports in Example A that 4-ethoxy-2,2,5,5-tetrakis(trifluormethyl)-3-oxazoline dissolves low-melting (83°–145° C. melting point) PTFE. There is no mention of dissolution of higher melting PTFE.

Polytetrafluoroethylene coatings on razor blade cutting edges are clearly known in the art. Furthermore, it appears that various solvents systems have been proposed in the literature for polytetrafluoroethylene. However, the art fails to appreciate the importance of a thin PTFE coating; especially during the initial, first shave. Furthermore, the art is silent on selective removal of polytetrafluoroethylene from razor blade cutting edges.

It is an object of the present invention to provide a razor blade cutting edge with a thin, well adhered coating which provides significantly improved initial cutting force effects when compared with the prior art. This improvement in cutting force translates to an improved first shave and often translates to improved subsequent shaves.

It is also an object of the present invention to provide a razor blade which causes fewer nicks, improved comfort, and/or improved closeness.

Furthermore, it is an object of the present invention to provide a method for producing these improved blades. The process utilizes novel processing steps.

These and other objects will become evident from the following.

SUMMARY OF THE INVENTION

The present invention relates to razor blade cutting edges which exhibit an improvement in the "first shave" cut. Conventional razor blade cutting edges exhibit surprisingly high initial cutting forces. Razor blades produced according to the present process exhibit significantly lower initial cutting forces which correlates with a more comfortable shave. Improved blades according to the present invention involve treating conventional razor blade cutting edges having an adherent polyfluorocarbon coating with a solvent to partially remove some of the coating. Preferred solvents include perfluoroalkanes, perfluorocycloalkanes, perfluoroaromatic compounds and oligomers thereof having a critical temperature or boiling point above the dissolution temperature for the polyfluorocarbon in the solvent. The present invention also relates to the method of producing these razor blade cutting edges.

DETAILED DESCRIPTION OF THE PRESENT INVENTION

Figure 1:
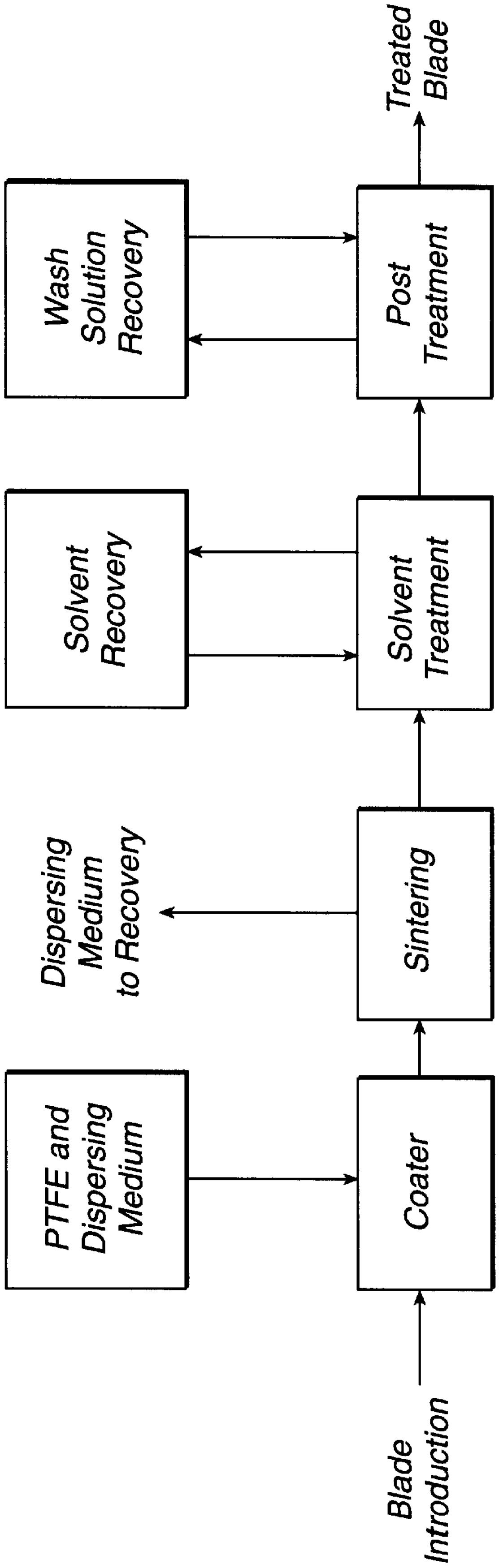
FIG. 1 is a schematic flow diagram of the present process for treating razor blade cutting edges.

All percentages and ratios described herein are on a weight basis unless otherwise indicated.

As used herein the term "razor blade cutting edge" includes the cutting point and facets of the blade. Applicant recognizes that the entire blade could be coated in the manner described herein; however; an enveloping coat of the type is not believed to be essential to the present invention. Razor blades according to the present invention include all types known in the art. For example, stainless steel blades are commonly used. Many other commercial razor blades also include a chromium/platinum interlayer between the steel blade and the polymer. This type of interlayer is sputtered onto the blade edge surface prior to polymer coating. Furthermore, the blade material can be coated with a Diamond Like Carbon (DLC) coating as described in U.S. Pat. Nos. 5,142,785 and 5,232,568, incorporated herein by reference, prior to polymer coating.

Various methods have been proposed in the past for coating razor blade cutting edges with polyfluorocarbons. See, for example, U.S. Pat. No. 5,263,256 to Trankiem, incorporated herein by reference. All of these methods invariably produced a blade which has a relatively thick initial coating of polymer. This can result in disproportionately high cutting force during the first shave.

Surprisingly, we have discovered that when a blade which is coated with a sintered polyfluorocarbon dispersion is subsequently treated with a suitable solvent, the resulting blade edge has a surface with excellent first shave characteristics.

The present process starts with a polyfluorocarbon-coated blade edge. Next, the blade is solvent-treated to remove most of the polyfluorocarbon but leaving a homogeneous thin coating. Without being bound to theory, it is likely that the present process results in a polyfluorocarbon coating that approaches the molecular level of thickness. Optionally, the solvent-treated blade is finally subjected to a post-treatment step to remove any excess solvent. Each of these phases of the present invention is further described below:

Preparing a Polyfluorocarbon-Coated Blade Edge

Polyfluorocarbon-coated blade edges according to the present invention can be prepared by any process known in the art. Preferably, the blade edge is coated with a polyfluorocarbon dispersion. The dispersion-coated blade edge is next heated to drive off the dispersing media and to sinter the polyfluorocarbon onto the blade edge. These processing steps are further described as follows:

A. Polyfluorocarbon Dispersion

According to the present invention, a dispersion is prepared from a fluorocarbon polymer. The preferred fluorocarbon polymers (i.e., starting material) are those which contain a chain of carbon atoms including a preponderance of $—CF_2—CF_2—$ groups, such as polymers of tetrafluoroethylene, including copolymers such as those with a minor proportion, e.g. up to 5% by weight of hexafluoroproplylene. These polymers have terminal groups at the ends of the carbon chains which may vary in nature, depending, as is well known, upon the method of making the polymer. Among the common terminal groups of such polymers are, $—H$, $—COOH$, $—Cl$, $—CCl_3$, $—CFClCF_2Cl$, $—CH_2OH$, $—CH_3$ and the like. While the precise molecular weights and distribution of molecular weights of the preferred polymers are not known with certainty, it is believed that they have molecular weights of from about 700 to about 3,000,000 preferably from about 25,000 to 200,000. There may be used mixtures of two or more fluorocarbon polymers, provided the mixtures have melt and melt flow rate characteristics as specified above, even though the individual polymers making up the mixture do not possess these characteristics. The most preferred starting material is polytetrafluoroethylene (PTFE).

A preferred polyfluorocarbon is produced from a fluorocarbon polymer starting material having a molecular weight of at least 1,000,000 in dry powder form, which is subjected to ionizing irradiation to reduce the average molecular weight of the polymer to from about 700 to about 700,000, preferably to from about 700 to about 51,000 and most preferably to about 50,000. This process is described in U.S. Pat. No. 5,263,256 incorporated herein by reference. The radiation dose is preferably from 20 to 80 Mrad and the ionizing radiation is preferably by gamma rays from a $Co^{60}$ source. The polyfluorocarbon is preferably polytetrafluoroethylene and irradiation is preferably effected to obtain a telomer having an average molecular weight of about 25,000.

The preferred commercial polyfluorocarbons include MP1100, MP1200 and MP1600 brand polytetrafluoroethylene powders manufactured by DuPont. The most preferred are MP1100 and MP1600 brand polytetrafluoroethylene powder.

Polyfluorocarbon dispersions according to the present invention comprise from 0.05 to 5% (wt) polyfluorocarbon, preferably from 0.7 to 1.2% (wt), dispersed in a dispersant media. The polymer can be introduced into the flow stream or mixed directly into an agitated reservoir and then homogenized. When injected into the flow stream, a static mixer downstream is preferred.

For the purpose of forming the dispersion which is sprayed onto the cutting edges, the polyfluorocarbon should have a very small submicron particle size. Powdered polyfluorocarbon starting material is normally available as a coarser material than this, and it may be ground to its desired fineness.

Dispersing medium is typically selected from the group consisting of fluorocarbons (e.g. Freon brand from DuPont), water, volatile organic compounds (e.g. isopropyl alcohol), and supercritical $CO_2$. Water is most preferred.

When an aqueous dispersing medium is used, a wetting agent is often necessary, especially when the particle size is large. Generally these wetting agents may be selected from the various surface active materials which are available for use in aqueous, polymeric dispersion. Such wetting agents include alkali metal salts of dialkyl sulfosuccinates, soaps of higher fatty acids, fatty amines, sorbitan mono- and di-esters of fatty acids and their polyoxyalkyleneether derivatives, alkali metal salts of alkylarylsulfonates, polyalkyleneether glycols, and the mono- and di-fatty acid esters of said glycols. The preferred wetting agents for use in the present invention are the non-ionics and more particularly the alkylphenylpolyalkyleneether alcohols such as Triton X100 and Triton X114 sold by Union Carbide, Ipegal CO-610 sold by Rhône-Poulenc, and Tergitol 12P12 sold by Union Carbide Company. Especially useful results have been obtained with the Tergitol 12P12, which is dodecylphenylpolyethyleneether alcohol containing 12 ethylene oxide groups. Generally, the amount of wetting agent employed may be varied. Usually, the wetting agent is used in amounts equal to at least about 1% by weight of the fluorocarbon polymer, preferably at least about 3% by weight of the fluorocarbon polymer. In preferred embodiments, the wetting agent is used in amounts ranging between about 3% to about 50% by weight of the polymer, with lower levels of wetting agent being desirable. Particularly good results were obtained using between about 3% to about 6%.

Nonionic surfactants are often characterized in terms of their HLB (hydrophile-lipophile balance) number. For simple alcohol ethoxylates, the HLB number may be calculated from $$HLB=E/5$$

where E is the weight percentage of ethylene oxide in the molecule.

Essentially, any wetting agent with a Hydrophile-Lipophile Balance number of from about 12.4 to about 18, preferably from about 13.5 to about 18.0, can be utilized in the present invention. For a further discussion of HLB numbers, see Kirk-Othmer, *Encyclopedia of Chemical Technology*, Vol. 22, pp 360–362, incorporated herein by reference.

B. Apply the dispersion

The dispersion may be applied to the cutting edge in any suitable manner to give as uniform a coating as possible, as for example, by dipping or spraying; nebulization is especially preferred for coating the cutting edges, in which case, an electrostatic field may be employed in conjunction with the nebulizer in order to increase the efficiency of deposition. For further discussion of this electrostatic spraying technique, see U.S. Pat. No. 3,713,873 of Fish, issued Jan. 30, 1973, incorporated herein by reference. Preheat of the dispersion may be desirable to facilitate spraying, the extent of preheating depending on the nature of the dispersion. Preheating of the blades to a temperature approaching the boiling point of dispersant media may also be desirable.

C. Sinter the polyfluorocarbon onto the blades

In any event the blades carrying the deposited polymer particles on their cutting edges must be heated at an elevated temperature to form an adherent coating on the cutting edge and to drive off the dispersant media. The period of time during which the heating is continued may vary widely, from as little as several seconds to as long as several hours, depending upon the identity of the particular polymer used, the nature of the cutting edge, the rapidity with which the blade is brought up to the desired temperature, the temperature achieved, and the nature of the atmosphere in which the blade is heated. It is preferred that the blades are heated in an atmosphere of inert gas such as helium, argon nitrogen, etc., or in an atmosphere of reducing gas such as hydrogen, or in mixtures of such gases, or in vacuo. The heating must be sufficient to permit the individual particles of polymer to, at least, sinter. Preferably, the heating must be sufficient to permit the polymer to spread into a substantially continuous film of the proper thickness and to cause it to become firmly adherent to the blade edge material.

The heating of the coating is intended to cause the polymer to adhere to the blade. The heating operation can result in a sintered, partially melted or melted coating. A partially melted or totally melted coating is preferred as it allows the coating to spread and cover the blade more thoroughly. For more detailed discussions of melt, partial melt and sinter, see *McGraw-Hill Encyclopedia of Science and Technology*, Vol. 12, 5th edition, pg. 437 (1992), incorporated herein by reference.

The heating conditions, i.e., maximum temperature, length of time, etc., obviously must be adjusted so as to avoid substantial decomposition of the polymer and/or excessive tempering of the metal of the cutting edge. Preferably the temperature should not exceed 750° F. A typical processing temperature for MP1100 brand polytetrafluoroethylene, manufactured by Dupont, is about 650° F.

Solvent Treatment

The primary feature of the present invention involves treating polyfluorocarbon blades, like those described above, with a solvent to essentially "thin" the polyfluorocarbon coating. The resulting blade possesses a uniformly thin coating along the cutting surface.

Solvents are selected based on the following parameters:

(1) Polyfluorocarbon-solvency

Melting point depression is used to identify solvency. Polymer melting points and melting depressions in solvents are measured in a Seiko Instrument DSC-220 Differential Scanning Calorimeter (DSC), at a heating rate of 10° C./min in nitrogen. The melting point is the minimum peak of the melting endotherm. Melting depression study used approximately 5 mg of PTFE/solvent in hermetic aluminum or stainless steel pans or glass ampules. Liquids which exhibit a PTFE melting point depression are considered to be solvents. The melting point depression establishes the lower range of dissolution temperatures.

(2) Solvent must be a liquid at a dissolution temperature

The solvent should be a liquid at the dissolution temperature. In other words, the solvent must have a boiling point above the processing temperature and a melting point below the dissolution temperature. Of course, this can be manipulated by changing the processing pressures; however, ambient pressures are preferred. In the event of processing at higher pressure, the solvent must have a critical temperature above the processing temperature.

(3) Low polarity

Polar molecules are generally not good solvents according to the present invention. Molecules with low or, most preferably, no polar functionality work best. The most preferred molecules are nonpolar aliphatic, cyclic, or aromatic perfluorocarbons; however, low molecular weight (LMW), flourine-end-capped homopolymers of hexafluoropropylene epoxide also work to some degree.

The process of solvent treating the polyfluorocarbon coated blade edge is carried out at the temperature required to dissolve the polymer, i.e. within the dissolution temperature range as defined above. Generally speaking, lower melting polymers will require lower temperatures, while higher melting polymers such as PTFE will require higher temperatures. Useful temperatures are illustrated in the Examples, and are sometimes above the boiling point at atmospheric pressure of the solvent, so that a pressure vessel will be needed to avoid boiling of the solvent. The processing temperature must not be above the critical temperature or the boiling point of the solvent, so the critical temperature of the solvent must be above the temperature of dissolution. Critical temperatures of many compounds can be found in standard references, and may be measured by methods known to those skilled in the art.

The solvent and polymer must be stable at the process temperature. Agitation will increase the rate of dissolution of the polymer along the blade edge. Two other factors influence the rate of dissolution: (1) higher interfacial surface area between the polymer and solvent gives faster rates, and (2) higher polymer molecular weight and higher polymer concentrations give slower rates of dissolution. The time required for dissolution will vary with the particular polymer and solvent chosen, as well as with the other factors discussed above. Specific examples of the solvent treatment appear in the examples.

Preferred solvents are perfluoroalkanes, perfluorocycloalkanes, perfluoro aromatic compounds and oligomers thereof. Many perfluoropolyethers (PTFE) work in some cases. As used herein, perfluorocycloalkanes refer to saturated is cyclic compounds, which may contain fused or unfused rings. In addition, the perfluorinated cycloalkane may be substituted by perfluoroalkyl and perfluoroalkylene groups. By perfluoroalkyl group is meant a saturated branched or linear carbon chain. As used herein "perfluoroalkylene group" is an alkylene group which is branched or linear and is bound to two different carbon atoms in carbocyclic rings.

Saturated perfluorocarbons with aliphatic ring structures and high critical temperatures were found to be the preferred solvents for allowing solubility of PTFE at the lowest temperatures and pressures. Most preferred perfluorinated solvents may be obtained from PCR, Inc., of Gainesville, Fla. Dodecafluorocyclohexane ($C_6F_{12}$), octafluoronaphthalene ($C_{10}F_8$), and perfluorotetracosane (n-$C_{24}F_{50}$) were obtained from the Aldrich Chemical Co. Perfluorotetradecahydrophenanthrene ($C_{14}F_{24}$) may be obtained from BNFL Fluorochemicals Ltd., Preston Lancashire, England; under the tradename Flutec PP11 commonly called perfluoroperhydrophenanthrene. A mixture of isomers of perfluoroperhydrobenzylnaphthalene ($Cl_7F_{30}$), with the tradename Flutec PP25, was obtained from ISC Division of Rhone-Poulenc Co (RP-ISC). A high-boiling oligomeric byproduct in the manufacture of Flutec PP11 ($C_{14}F_{23}(C_{14}F_{22})nC_{14}F_{12}$ where n=0,1 and 2) was also obtained from DuPont. The latter is a gross mixture of perfluorocarbons whose generalized structure is shown in the examples with n=0 and 1, predominantly. The approximate boiling range of the components is 280–400° C. When dissolving MP1000, MP1600 or Vydax brand PTFE off blade edges, optimum conditions occur between 300–340° C., after 10–200 seconds.

As used herein, perfluoropolyethers (PFPE) refer to perfluorinated compounds containing the —($CF_2$—CFR—O—)n linkage where R═F,$CF_3$. These compounds are sometimes called perfluoroalkylether (PFAE) or perfluoropolyalkylether (PFPAE). Preferably, the polymer chain is completely saturated and contains only the elements carbon, oxygen, and fluorine; hydrogen is not present.

The most preferred PFPE solvents are Krytox® brand fluorinated oils manufactured by DuPont Specialty Chemicals and Fomblin™ brand fluorinated oils made by Montedison UK Ltd. Krytox fluorinated oils are a series of low-molecular-weight, fluorine-end-capped homopolymers of hexafluoropropylene epoxide with the following chemical structure:

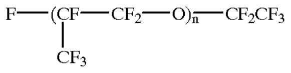

where n = 10–60.

The polymer chain is completely saturated and contains only the elements carbon, oxygen, and fluorine; hydrogen is not present. On a weight basis, a typical Krytox oil contains 21.6% carbon, 9.4% oxygen, and 69.0% fluorine.

The Chemical Abstracts Index name for Krytox fluorinated oils is oxirane trifluoro (trifluoromethyl)-homopolymer, and the CAS Registry Number is 60164-51-4.

Post Treatment

After the blade edges have been solvent-treated as discussed above, the blades may be cleaned to remove any excess solvent. This can be done by dipping the blade edge into a wash solution for the solvent. Preferably the wash solution should be easily separable from the solvent and be a true solvent for the solvent described in the previous section.

Preferably, the blades are washed at a temperature near the boiling point of the wash solution of Fluorinert FC-75 brand perfluoro (2-n-butyl hydrofuran) solvent, manufactured by 3M or HFC-43 brand 1,1,1,2,3,4,4,5,5,5,-decafluoropentane manufactured by DuPont.

Another preferred post treatment step involves separating dissolved PTFE from the solvent. This separation allows for the reuse of the solvent and may also afford the reuse of the PTFE. This separation can be accomplished by distillation or any method known in the art.

The following specific examples illustrate the nature of the present invention. The quality of the first shave obtained with blades of each of the following examples is equal to or better than the quality obtained in any subsequent shave; and the decrease in quality with successive shaves in the case of blades of each particular example is equal to or less than the decrease in quality in the case of conventional fluorocarbon polymer-coated blades manufactured without the present solvent treatment step.

EXAMPLES

Materials

Fluorinert FC-75. Mainly perfluoro (2-n-butyl hydrofuran). $C_8F_{12}O$. 3M Company.

Flutec PP11 oligomers. Perfluoroperhydrophenanthrene oligomers. $(C_{14}F_{23}(C_{14}F_{22})_nC_{14}F_{23}$ where n=0, 1, and 2.

Flutec PP11 oligomer (n=0, 1, 2) MP1600, brand. Polytetrafluoroethylene. $—(C_2F_4)_n—$, DuPont Company. 1% in isopropanol.

Blade Preparation

A batch of blades was spray coated and sintered as follows:

A fixture containing a magazine of the blades is set on a conveyer belt. The blade fixture is sprayed with a PTFE/ispropanol dispersion at 1% (w/w). The magazine fixture passes through an oven where the PTFE is sintered to the blade edge.

The batch of sintered blades were divided into two groups: (1) a control group representing current commercial blades which will not undergo any solvent treatment and (2) a group representing the present invention which undergo solvent treatment.

Solvent Treatment-Dipping and Cleaning Procedures

Flutec PP11 oligomer is preheated in a 500 ml two-neck round bottom flask with a positive nitrogen flow. Approximately 35–50 blades are stacked in one end of a handheld device and are dipped into Flutec oligomer at 310° C. for 2 minutes. For post-treatment cleaning of the Flutec oligomer, the blades are flushed 5 times in a Soxhlet extractor, containing Fluorinert FC-75 heated to 108° C.

Cutting Force Determination

To demonstrate the "first shave" improvement of the present invention, the cutting force of each blade is determined by measuring the force required by each blade to cut through a wool felt. Each blade is run through the wool felt cutter 500 times and the force of each cut is measured on a recorder. A plot of cutter force of each cut is found in FIG. 6. As can be seen from the plot FIG. 6, razor blade edges which have been treated according to the present invention exhibit lower cutting forces at and near the first cut. First shave improvements have been observed in actual shave tests comparing blades produced according to the present invention with commercial blades.

Characteristics of Blades Treated with Flutec Oligomer

Figure 2:
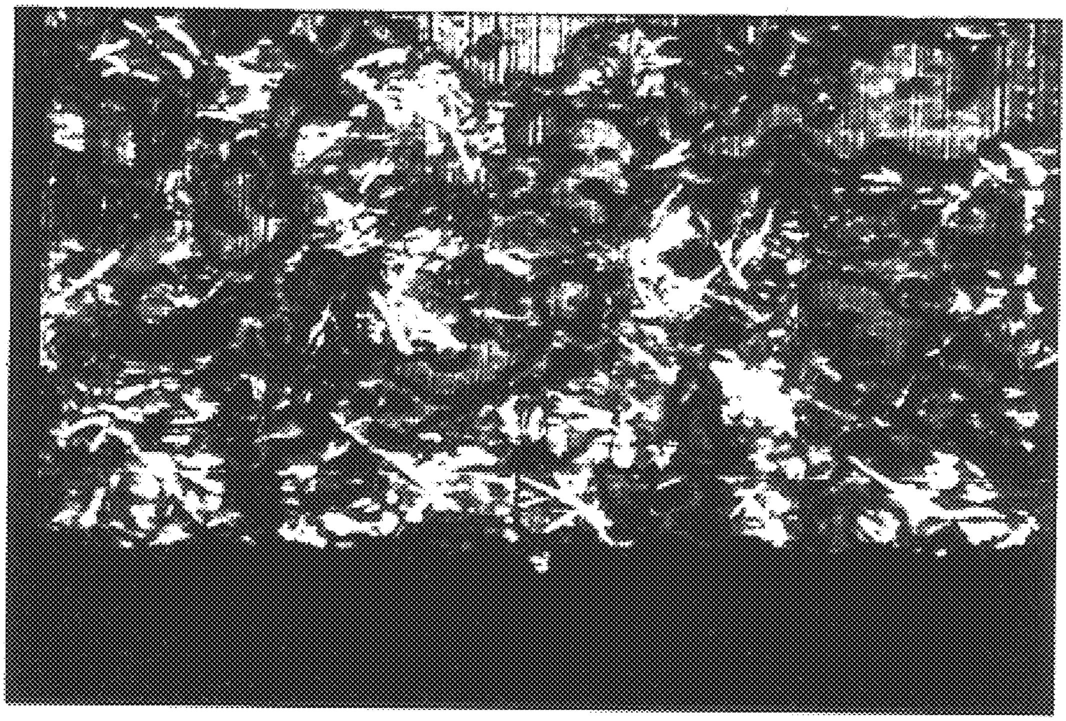
FIG. 2 is a photomicrograph, magnification about 900×, of an untreated, PTFE-coated razor blade cutting edge.
Figure 3:
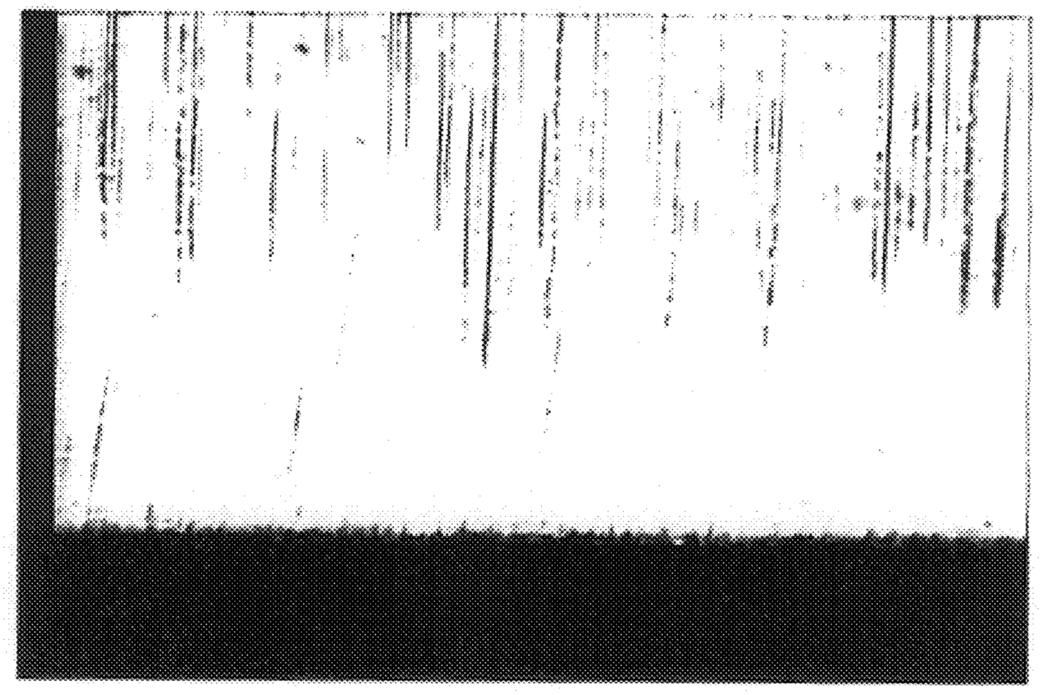
FIG. 3 is a photomicrograph, magnification about 900×, of the PTFE-coated blade edge of FIG. 2 after the present solvent treatment.
Figure 4:
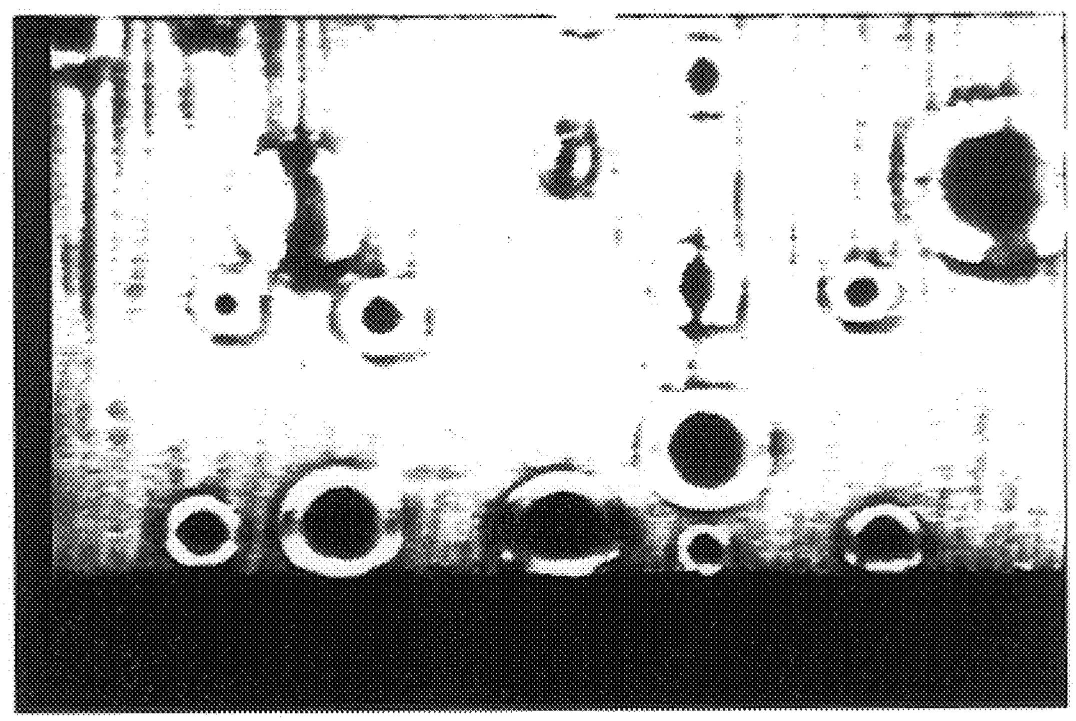
FIG. 4 is a photomicrograph, magnification of about 900×, of a razor blade cutting edge as in FIG. 3 after 500 passes through wool felt. The beads of liquid are silicone oil and demonstrate that the metal surface still retains an adequate PTFE coat.
Figure 5:
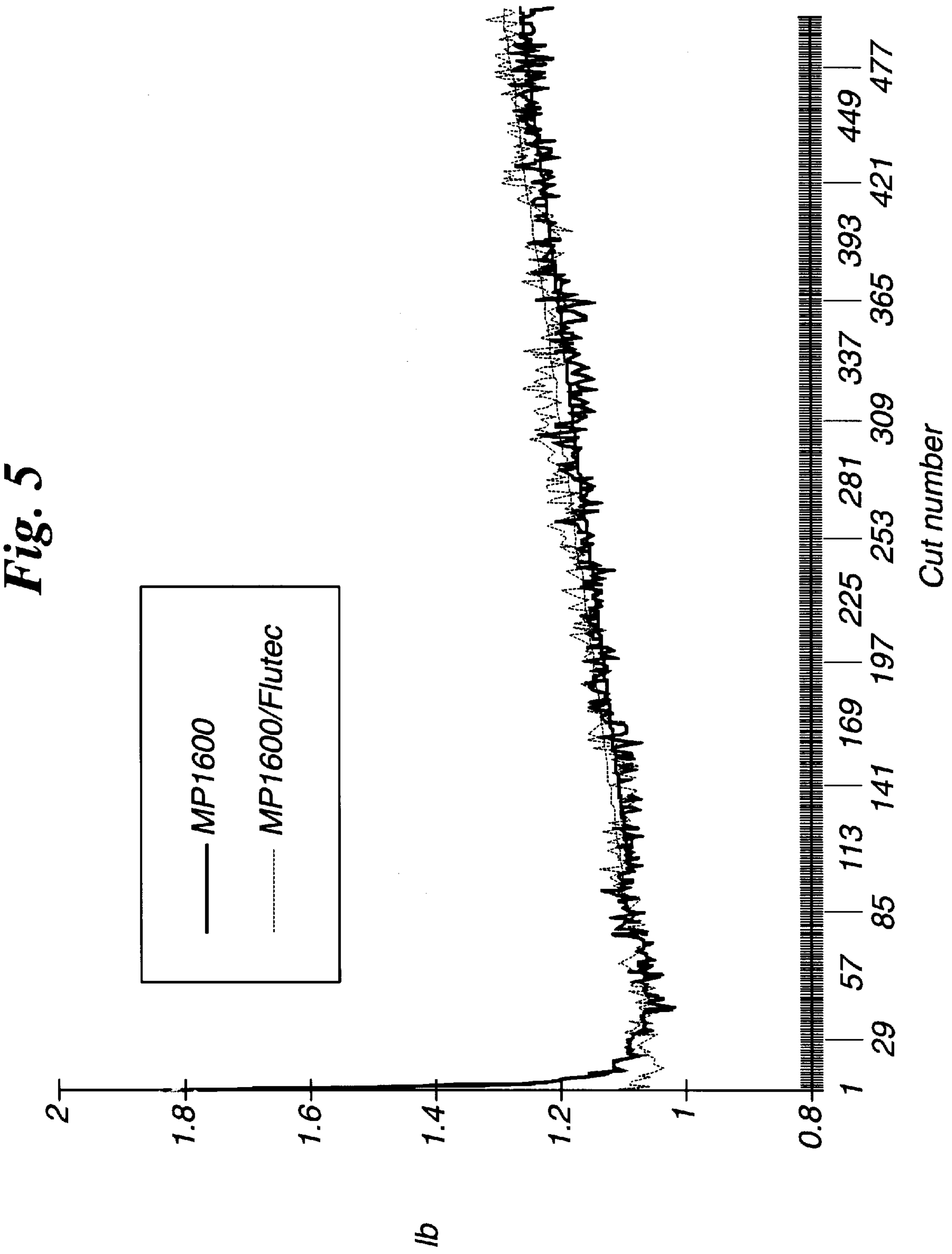
FIG. 5 is a Plot of the force required for a razor blade to cut through wool felt vs. the number of iterations through the wool felt for a control set and a set according to the present invention.

Under microscopy, no visible PTFE coating is seen in the treated blade, (see FIG. 3) as compared to an untreated edge that is covered with PTFE crystallites (see FIG. 2). Nevertheless, all treated blades have good PTFE adhesion, as confirmed by the low cutting force value obtained after 500 cuts (L500) and the fact that blades sprayed in silicone oil after 500 cuttings generate uniform beading of the oil on the blade edge (see FIG. 5). [Note: Silicone oil spreads on uncoated blade edges and does not bead.] It is further confirmed by the fact that the first cut (L1) values of these treated blades are low, reinforcing that solvent treatment effectively removes a PTFE film down to a thin layer (possibly to chemically bonded layer).

What is claimed is:

1. A method of forming a polyfluorocarbon coating on a razor blade cutting edge comprising the steps of:

(a) coating a razor blade cutting edge with a dispersion of polyfluorocarbon in a dispersing medium, (b) heating the coating sufficiently to adhere the polyfluorocarbon to said blade edge; and (c) treating the said blade edge with a solvent to partially remove said coating.

2. A method of forming a polyfluorocarbon coating on a razor blade cutting edge according to claim 1 wherein the critical temperature or boiling point of said solvent is above the dissolution temperature for said polyfluorocarbon in said solvent and wherein the blade treatment step (c) occurs at a process temperature below the boiling point or critical temperature of the solvent and above the dissolution temperature for said polyfluorocarbon in said solvent.

3. A method of forming a polyfluorocarbon coating on a razor blade cutting edge according to claim 2 wherein said solvent is selected from the group consisting of perfluoroalkanes, perfluorocycloalkanes, perfluoroaromatic compounds and oligomers thereof.

4. A method of forming a polyfluorocarbon coating on a razor blade cutting edge according to claim 3 wherein said polyfluorocarbon is polytetrafluoroethylene having a molecular weight of from about 700 to about 3,000,000.

5. A method of forming a polyfluorocarbon coating on a razor blade cutting edge according to claim 4 wherein said polytetrafluoroethylene has a molecular weight of from about 25,000 to about 3,000,000.

6. A method of forming a polyfluorocarbon coating on a razor blade cutting edge according to claim 5 wherein said solvent is selected from the group consisting of:

dodecafluorocyclohexane ($C_6F_{12}$), octafluoronaphthalene ($C_{10}F_8$), perfluorotetracosane ($n\text{-}C_{24}F_{50}$), perfluorotetradecahydrophenanthrene ($C_{14}F_{24}$), isomers of perfluoroperhydrobenzylnaphthalene ($C_{17}F_{30}$), high-boiling oligomeric byproduct in the manufacture of perfluorotetradecahydrophenanthrene ($C_{14}F_{24}$), perfluoropolyethers, and combinations thereof.

7. A method of forming a polyfluorocarbon coating on a razor blade cutting edge according to claim 6 wherein said solvent comprises perfluoroperhydrophenanthrene oligomer having the general formula:

$$C_{14}F_{23}(C_{14}F_{22})_nC_{14}F_{23}$$

where n=0, 1 and 2.

8. A method of forming a polyfluorocarbon coating on a razor blade cutting edge according to claim 7 further comprising a post treatment step (d) to remove excess solvent.

9. A method of forming a polyfluorocarbon coating on a razor blade cutting edge according to claim 8 wherein post treatment step (d) comprises dipping the blade edge in a wash solution at or near the boiling point of the wash solution.

10. A method of forming a polyfluorocarbon coating on a razor blade cutting edge according to claim 9 wherein said wash solution is comprised of perfluoro (2-n-butyl hydrofuran).

11. A razor blade produced by the process comprising:

(a) providing a razor blade having a cutting edge;

(b) coating said cutting edge with a dispersion of polyfluorocarbon in a dispersing medium, (c) heating the coating sufficiently to adhere the polyfluorocarbon to said blade edge; and (d) treating said cutting edge with a solvent to partially remove said coating.

12. A razor blade according to claim 11 wherein the critical temperature or boiling point of said solvent is above the dissolution temperature for said polyfluorocarbon in said solvent and wherein the blade treatment step (d) occurs at a process temperature below the boiling point or critical temperature of the solvent and above the dissolution temperature for said polyfluorocarbon in said solvent.

13. A razor blade according to claim 12 wherein said solvent is selected from the group consisting of perfluoroalkanes, perfluorocycloalkanes, perfluoroaromatic compounds and oligomers thereof.

14. A razor blade according to claim 13 wherein said polyfluorocarbon is polytetrafluoroethylene having a molecular weight of from about 700 to about 3,000,000.

15. A razor blade according to claim 14 wherein said polytetrafluoroethylene has a molecular weight of from about 25,000 to about 3,000,000.

16. A razor blade according to claim 15 wherein said solvent is selected from the group consisting of:

dodecafluorocyclohexane ($C_6F_{12}$), octafluoronaphthalene ($C_{10}F_8$), perfluorotetraxosane (n-$C_{24}F_{50}$), perfluorotetradecahydrophenanthrene ($C_{14}F_{24}$), isomers of perfluoroperhydrobenzylnaphthalene ($C_{17}F_{30}$), high-boiling oligomeric byproduct in the manufacture of perfluorotetradecahydrophenanthrene ($C_{14}F_{24}$), perfluoropolyethers, and combinations thereof.

17. A razor blade according to claim 16 wherein said solvent comprises perfluoroperhydrophenanthrene oligomer having the general formula:

$$C_{14}F_{23}(C_{14}F_{22})_nC_{14}F_{23}$$

where n=0, 1 and 2.

18. A razor blade according to claim 17 further comprising a post treatment step (e) to remove excess solvent.

19. A razor blade cutting edge according to claim 18 wherein post treatment step (e) comprises dipping the blade edge in a wash solution at or near the boiling point of the wash solution.

20. A razor blade according to claim 19 wherein said wash solution is comprised of perfluoro (2-n-butyl hydrofuran).

* * * * *